Patented Dec. 7, 1943

2,336,097

UNITED STATES PATENT OFFICE 2,336,097

TREATMENT OF GASES AND VAPORS

Arthur John Lindsay Hutchinson, Los Angeles, Calif., assignor to The Fluor Corporation, Ltd., Los Angeles, Calif., a corporation of California Application November 26, 1940, Serial No. 367,191

7 Claims. (Cl. 196—8)

This invention relates to an improved method and apparatus for the treatment of mixtures of gases and vapors to recover a desired condensate therefrom and has particular reference to the recovery of gasoline from natural gas or from analogous gaseous mixtures such as refinery still gases.

An object of the invention is to provide an absorption process and apparatus for the treatment of mixtures of gases and vapors to recover desired condensates therefrom in which lower absorption temperatures may be maintained by the aid of waste heat from the system.

Another object of the invention is to provide heat economizers of such character that an increase of 25% or more in the recovery of butane or other desired constituents is made possible in an absorption plant without any additional heat load on the plant.

A further object is to provide improvements in heat exchange in an absorption plant to substantially double the treating capacity of a given plant without additional equipment.

With these primary objects in view, the invention may be applied to an absorption system, such as is used for recovering condensates from natural gas, as shown in the diagrammatic sheets of drawings.

Figure 1:
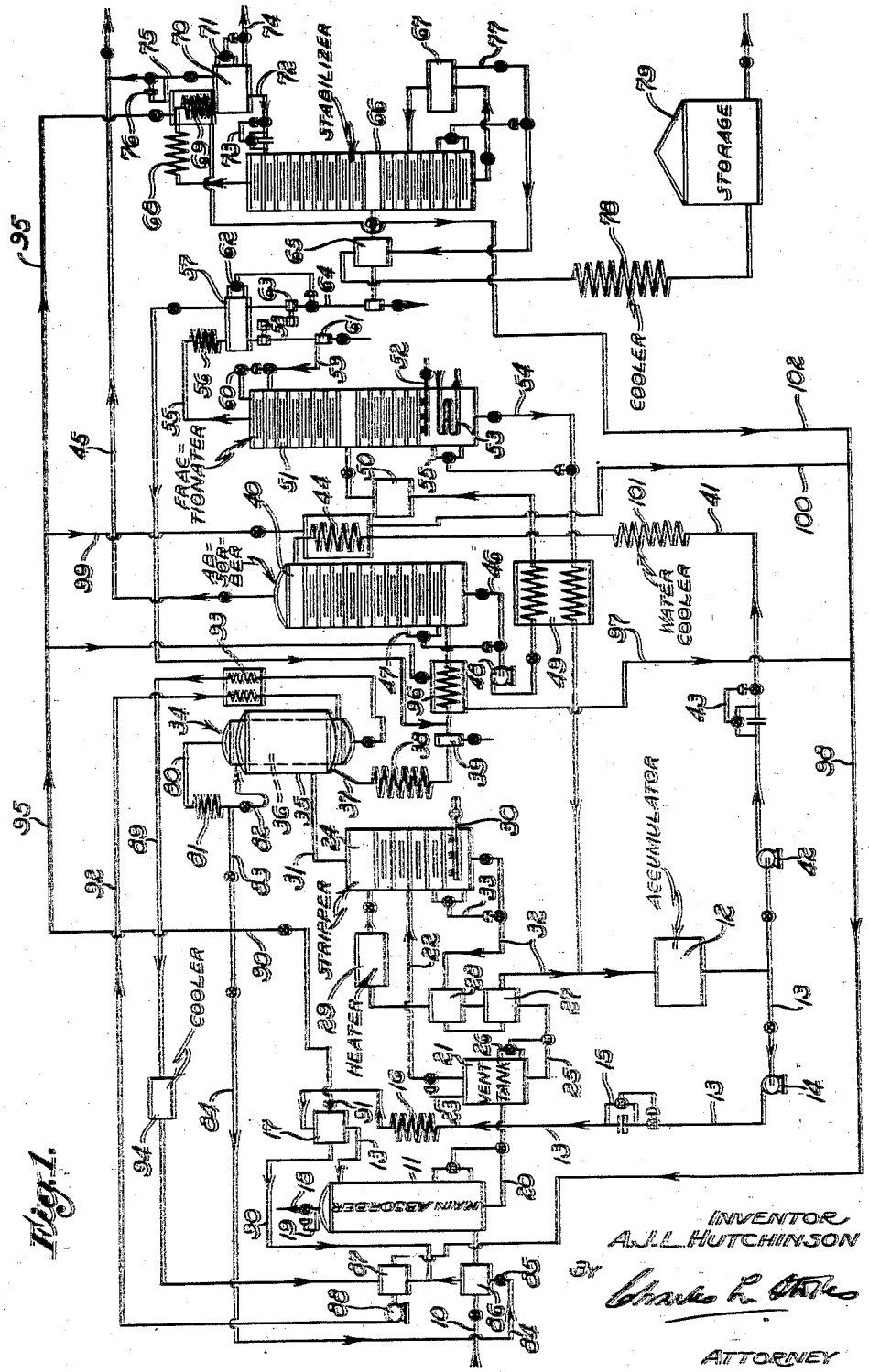

Referring to Fig. 1 of the drawings, it may be seen that natural gas, for instance, containing the so-called wild gases consisting of methane, ethane, and also propane, iso-butane, n. butane, iso-pentane, n. pentane, and perhaps portions of other hydrocarbon fractions of higher boiling points, is passed through line 10 into any well known absorption tower 11 under any desired pressure which may be as high as 2000 pounds per square inch and generally ranges from 100 to 1500 pounds per square inch.

In tower 11 the ascending gases are contacted with descending absorption oil supplied to tower 11 from an accumulator tank 12 through line 13 by the use of pump 14, which may be the usual steam pump, the supply of absorption oil being governed by a flow regulator 15 while its temperature is reduced to a desired degree by passage through a cooler 16 and a heat exchanger 17.

The contacting of the gas with the cooled absorption oil under a predetermined pressure results in the abstraction by absorption of desired fractions while undesired fractions are vented through line 18 controlled by pressure regulator 19.

The "fat" absorption oil containing desired fractions is withdrawn from tower 11 through line 20 and passes, under a reduced pressure, into a vent tank 21 to release certain of the absorbed fractions which then pass through line 22, controlled by pressure regulator 23, under a further reduced pressure into a stripper 24.

The remainder of the absorption oil is withdrawn from vent tank 21 through line 25, controlled by liquid level regulator 26, and picks up heat by passing through heat exchangers 27, 28, and heater 29 before discharge into stripper 24.

In stripper 24, the heated absorption oil is completely stripped of all absorbed constituents by open steam added through line 30 and the vapors and gases from line 22, the temperature and pressure in stripper 24 being such that some of the heavier absorption oil will be carried off together with the released fractions through line 31 for recovery and further uses. Since the still temperatures are such as to produce partial vaporization of a portion of the absorption oil, the vapor temperature is correspondingly high. Consequently, there is available a relatively high temperature level or potential which may be utilized to particular advantage for purposes of cooling or refrigeration, as will appear.

The "lean" or denuded absorption oil from stripper 24 passes through line 32, controlled by liquid level regulator 33, into accumulator 12, its temperature being reduced by passage through heat exchangers 28 and 27.

The desired fractions from stripper 24 pass in vapor form through line 31 into an ammonia plant generally designated as 34 in which the heat of the vapors is utilized for some of the purposes of this invention.

This is accomplished by passing the hot vapors from line 31 into an annular space, or condensing zone, 35 surrounding an ammonia still 36 whereby sufficient heat is supplied to the ammonia liquor in still 36 to liberate the ammonia gas.

The hydrocarbon condensate from zone 35 is withdrawn, together with any gas, through line 37 and passes through cooler 38 and water trap 39 into a low pressure absorption tower 40 which is supplied with cold absorption oil from accumulator 12 by the use of line 41, pump 42, flow regulator 43 and cooler 44.

The reabsorption in absorber 40 assures the removal of all absorption oil and desired fractions from the bulk of the remaining undesired fractions which may then pass through line 45 to any desired place of use.

The "fat" absorption oil from tower 40 is withdrawn through line 46, controlled by liquid level regulator 47, by pump 48 and forced through heat exchanger 49 and heater 50 into a fractionating tower 51, wherein the absorption oil is closely fractionated to remove all desired fractions and make a clean separation between such fractions and the absorption oil.

This is done by the application of predetermined pressures and the use of live steam from line 52, or closed steam through coil 53, or both, and the stripped absorption oil passes through line 54, controlled by liquid level regulator 55, and heat exchanger 49 back into accumulator 12.

The vaporized fractions from fractionater 51 pass through line 55 and condenser 56 into a reflux condensate tank 57 whence a portion of the condensate is taken by pump 58 to be forced through a line 59, controlled by flow regulator 60, into the upper part of fractionater 51, while any water may be abstracted through trap 61.

The remaining accumulating condensate from tank 57, in which a reflux supply is maintained by regulator 62, is taken by pump 63 and forced through line 64 and heat exchanger 65 into a stabilizer 66 wherein stabilization is effected to obtain a product having the desired vapor pressure and boiling range.

This is accomplished by maintaining a predetermined pressure in stabilizer 66 while supplying heat through a reboiling heater 67 so that all undesired fractions pass overhead through cooler 68 and condenser 69 to a reflux condensate tank 70, controlled by liquid level regulator 71, whence a portion may be returned to the top of stabilizer 66 by way of line 72 and flow regulator 73 while another portion is withdrawn through pipe 74. Any undesired gases are withdrawn through line 75 and pressure regulator 76 into discharge pipe 45 for further disposal.

The stabilized product is withdrawn from the bottom of stabilizer tower 66 and reboiler 67 through line 77 and its temperature is reduced to atmospheric temperature, or higher or lower, by means of heat exchanger 65 and cooler 78 while on its way to storage 79.

Merely by way of illustration and not of limitation, one example of the pressures used through the absorption and stripping and fractionating system heretofore described is tabulated:

| | Pressure, pounds |
|---|---|
| Absorption tower 11 | 425 |
| Vent tank 21 | 225 |
| Stripper 24 | 55 |
| Absorber 40 | 52 |
| Fractionator 51 | 55 |
| Stabilizer 66 | 200 |

The temperatures in the various elements, as well as the above pressures, will be varied to meet conditions requiring a specification stabilized product and the above described system forms but the foundation for the present invention now to be more fully described for assuring that the capacity of the above described system can be doubled with an increased yield of desired and useful fractions.

In addition to the heat exchangers already mentioned the invention includes the use of the heat abstracted by the ammonia plant 34 from the overhead from stripper 24.

The ammonia vapor from ammonia still 36 passes through line 80 into a condenser 81 where it is condensed. A small amount of liquid ammonia is returned to still 36 through line 82 to prevent water from passing overhead from the still. The balance of the liquid condensed passes through line 83 and line 84 to be expanded through valve 85 into gas cooler 86. On expansion, part of the liquid ammonia evaporates, dropping the temperature of the balance. This cold liquid then boils around the tubes of the heat exchanger, extracting heat from the incoming gas. The vapors from this gas cooler pass into ammonia absorber 87 where they are absorbed in cooled weak ammonia liquor brought from still 36 by line 89. Another stream of liquid ammonia is taken from line 83 through line 90 and expanded through valve 91 into oil chiller 17 where, by the same process described for the gas, the oil is chilled passing through line 13 into absorber 11. The ammonia vapors generated in oil chiller 17 pass through line 90 into ammonia absorber 87.

The water charged with the ammonia from ammonia absorber 87 is forced by pump 88 through line 92 into ammonia still 36 where the ammonia is recovered for use in the cycle. A heat exchanger 93 and a cooler 94 serve to bring the temperature of the weak ammonia liquor down to the desired degree.

In this manner, by the use of heat normally wasted from stripper 24, not only is refrigeration provided in tower 11 but such refrigeration is provided at a much lower operating cost than is possible under present operations because no additional heat is applied to the system from any outside source. This also reflects a saving in heat abstracted from the vapors from stripper 24 in place of being abstracted by water cooling in a cooling tower or in some other manner. This results in very much increasing the absorption efficiency of tower 11 due to the much higher selectivity of absorption obtained at a lower temperature and the resulting increased absorption of the desired fractions; consequently, the capacity of the remainder of the system will be increased substantially in proportion to the increased absorption efficiency of tower 11.

While normally there is sufficient heat available in the vapors from stripper 24 to operate ammonia still 36, as described, if the available heat is insufficient for this purpose, further economy may be effected in the system by utilizing exhaust steam from pumps 14 and 42 or any other pumps in the system.

As illustrative of the beneficial effects of the described ammonia refrigeration from waste heat and comparing the invention with a similar plant in which the vapors from stripper 24 are passed directly through an ordinary condenser 38, there is found to be an increase in capacity of from 60% to 85% without any increase of oil circulation in the main absorber 11. At the same time, the efficiency of the main absorber is greatly increased due to a drop in temperature from 85° F. to 55° F. by reason of the ammonia refrigeration.

This is accomplished without any increase of other plant equipment except in stabilizer 66 which increased in heat load due to the larger volume of material handled. However, the heat load on stabilizer 66 is a relatively small part of the total heat load through the described system and the use of stabilizer 66 is optional with the present invention, particularly in view of present-day refinery practice in which large volumes of unstabilized gasoline are now customarily handled.

Depending on the available refrigeration from ammonia still 34, a portion of the liquid ammonia may be passed through header 95 into a chiller 96 surrounding pipe 37 to materially reduce the temperature of condensate and gases entering reabsorber 40 and the expanded ammonia gas will pass through line 97 into header 98 and thence to ammonia absorber 87.

Similarly, further liquid ammonia can pass from header 95 into line 99 and around cooler 44 to chill the absorption oil entering reabsorber 40, the expanded ammonia then passing through line 100 into header 98. In the event that cooler 44 is used as a refrigerator with ammonia gas, a precooler 101 may be additionally used.

In the event that it is desired to make a high recovery of very volatile fractions, header 95 may terminate in a chiller 69 to which vapors precooled in cooler 68 are supplied, and the expanded ammonia is thence returned through pipe 102 to header 98 for recovery and reuse.

It will be understood that while the use of ammonia has been heretofore described as giving the high efficiency in the system by use of waste heat, the term "ammonia" is merely illustrative and the invention comprehends the use of any mixture of liquids and volatile absorbed refrigerants known in the art. For instance, mixtures of certain absorption oils with either propane, butane, ethylene or propylene are quite suitable, as well as other similar mixtures.

Figure 2:
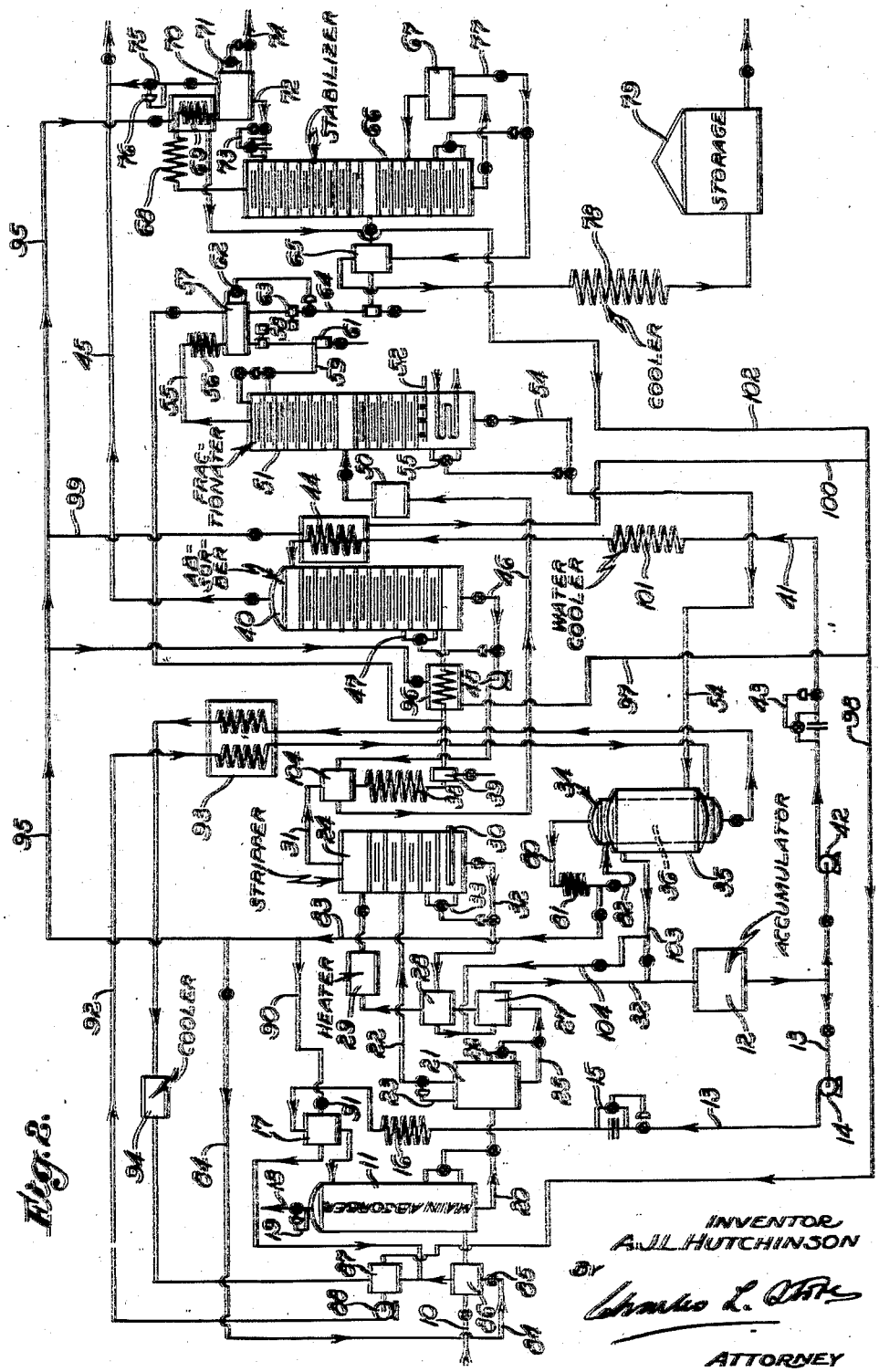

Referring to Fig. 2, in which like numerals indicate parts similar to Fig. 1, an improved result is likewise obtained by using the ammonia plant 34 to abstract the waste heat of the hot oil bottoms from fractionater 51.

In this case, the heat exchanger 49 is dispensed with and the hot stripped absorption oil passes through line 54 into the annular heating zone 35 in which it imparts its waste heat to the ammonia liquor in still 36, the ammonia from which is utilized to obtain the refrigerating effect previously described. The thus cooled absorption oil then passes through line 103 back to accumulator 12 for reuse, or all or a portion thereof may pass through line 104 into line 32 to have further heat abstracted in heat exchanger 27.

According to this disposition of ammonia plant 34, the hot vapors from stripper 24 will pass through line 31 and heat exchanger 104 wherein they lose heat to the cold unstripped absorption oil passing through line 46 to fractionater 51.

At times it may be desirable to use the dispositions of Fig. 1 and Fig. 2 in a single system provided the waste available heat in either is insufficient to provide sufficient refrigeration for all the purposes described herein, in which event the required connections for the liquid ammonia may be made very readily, the primary factor being the need for assuring the requisite lowering of the temperature of absorption at the main absorber 11.

While heat exchangers 17 and 86 are shown in the drawings exterior to main absorber 11 it will be understood that these may be interior of tower 11 at the top and bottom to assure the desired effects.

I claim as my invention:

1. The process of treating gases and vapors which comprises: passing a mixture of hydrocarbon gases and vapors under superatmospheric pressure through lean higher boiling absorption oil in a first absorption zone to absorb certain fractions therefrom, thereafter reducing the pressure and increasing the temperature of the resulting rich absorption oil to release absorbed hydrocarbon fractions in vapor form together with some absorption oil, passing said heated released vapors in indirect heat exchanging relation with refrigerant liquor to release gaseous refrigerant therefrom and to partially condense said released hydrocarbon vapors, reabsorbing the resulting condensate in lean reabsorption oil in a second absorption zone and at a reduced temperature, fractionating the resulting rich reabsorption oil at an increased temperature to completely vaporize and separate the hydrocarbons of said condensate, passing the thus fractionated lean reabsorption oil in heat exchanging relationship with the cooler rich unfractionated reabsorption oil, and condensing and then expanding the released gaseous refrigerant to pass in heat exchanging relationship with the first mentioned lean absorption oil and said mixture of gases and vapors prior to their initial contact in the system.

2. In a process for absorbing hydrocarbon fractions from gases in which a stream of gas is passed through higher boiling absorption oil wherein certain fractions are absorbed, the absorption oil is then heated to separate absorbed fractions in vapor form together with some absorption oil, and the separated fractions are recovered, that combination of steps which comprises: passing the hot separated vapors at substantially their temperature of separation from the unvaporized absorption oil in indirect heat exchange relationship with refrigerant liquor to release refrigerating gas therefrom, liquefying said refrigerating gas, expanding the liquefied refrigerating gas in indirect heat exchange relationship with said absorption oil to cause material reduction in the temperature of absorption of said hydrocarbon fractions, then reabsorbing the thus utilized refrigerating gas in cooled liquor from which it was released.

3. In a process for absorbing hydrocarbon fractions from gases in which a stream of gas is passed through higher boiling absorption oil wherein certain fractions are absorbed, the absorption oil is then heated to separate absorbed fractions in vapor form together with some absorption oil, and the separated fractions are recovered, that combination of steps which comprises: passing the hot separated vapors at substantially their temperature of separation from the unvaporized absorption oil in indirect heat exchange relationship with refrigerant liquor to release refrigerating gas therefrom, liquefying said refrigerating gas, expanding the liquefied refrigerating gas in indirect heat exchange relationship with said hydrocarbon fractions to materially reduce their temperature during absorption in said absorption oil, then reabsorbing the thus utilized refrigerating gas in cooled liquor from which it was released.

4. In a process for absorbing hydrocarbon fractions from gases in which a stream of gas is passed through higher boiling absorption oil wherein certain fractions are absorbed, the absorption oil is then heated to separate absorbed fractions in vapor form together with some absorption oil, and the separated vapors are recovered, that combination of steps which comprises: passing the hot separated vapors at substantially their temperature of separation from the unvaporized absorption oil in indirect heat exchange relationship with refrigerant liquor to release refrigerating gas therefrom, liquefying said refrigerating gas, expanding the liquefied refrigerating gas in indirect heat exchange relationship with said absorption oil and said hydrocarbon fractions to cause material reduction in the temperature of absorption during contact, then reabsorbing the thus utilized refrigerating gas in cooled liquor from which it was released.

5. In a process for absorbing hydrocarbon fractions from gases in which a stream of gas is passed through higher boiling absorption oil wherein certain fractions are absorbed, the absorption oil is then heated to separate absorbed fractions in vapor form together with some absorption oil, and the separated vapors are recovered, that combination of steps which comprises: passing the hot separated vapors at substantially their temperature of separation from the unvaporized absorption oil in indirect heat exchange relationship with refrigerant liquor to release refrigerating gas therefrom, liquefying said refrigerating gas, simultaneously expanding the liquefied refrigerating gas in two separate streams, one of which passes in indirect heat exchange with said hydrocarbon fractions and the other of which passes in indirect heat exchange with said absorption oil prior to their contact, to effect material reduction in their temperature during absorption and material increase in the percentage of hydrocarbon fractions absorbed, then reabsorbing the thus utilized refrigerating gas in cooled liquor from which it was released.

6. Apparatus for absorbing hydrocarbon fractions from gases comprising in combination: a main absorption tower, a heated stripper, a second absorption tower and a fractionater, means to pass a continuous supply of hydrocarbon gases into the main tower, means to pass a continuous supply of absorption oil into the main tower, a connection to pass the absorption oil from the main tower into the stripper wherein absorbed fractions are liberated together with some of the absorption oil, means including a refrigerant still to abstract heat from said liberated fractions and to vaporize refrigerating gas therein, means to pass the cooled fractions into said second absorption tower into contact with further absorption oil therein, a pipe from said second tower to said fractionater to pass said further absorption oil, a withdrawal line from said fractionater in indirect heat exchange with said pipe, refrigerating gas connections from said refrigerant still in indirect heat exchange with said continuous gas supply and said continuous absorption oil supply including means for condensing and expanding the refrigerating gas from said still, and means for absorbing said expanded refrigerating gas in cooled liquor from said still and returning the mixture to said still.

7. In a process for absorbing hydrocarbons from gases in which a stream of gas is passed through a stream of higher boiling absorption oil wherein certain fractions are absorbed, the absorption oil is heated in a stripping zone to separate absorbed fractions in vapor form together with some absorption oil, and the separated fractions are recovered, that combination of steps which comprises: introducing steam to said stripping zone to aid the vaporization of said fractions, passing the hot separated vapor and steam mixture at substantially their temperature of separation from the unvaporized absorption oil in indirect heat exchange relationship with refrigerant liquor to release refrigerating gas therefrom, liquefying said refrigerating gas, expanding the liquefied refrigerating gas in indirect heat exchange relationship with one of the first mentioned streams to cause material reduction in the temperature of absorption of said hydrocarbon fractions, and then reabsorbing the thus utilized refrigerating gas in cooled liquor from which it was released.

ARTHUR JOHN LINDSAY HUTCHINSON.